US007969160B2

(12) United States Patent
Lin

(10) Patent No.: US 7,969,160 B2
(45) Date of Patent: Jun. 28, 2011

(54) ELECTROLYTIC CAPACITOR

(75) Inventor: Chieh-Fu Lin, Kaohsiung Hsien (TW)

(73) Assignee: Gemmy Electronics Co., Ltd., Kaohsiung Hsien (TW)

( * ) Notice: Subject to any disclaimer, the term of this patent is extended or adjusted under 35 U.S.C. 154(b) by 230 days.

(21) Appl. No.: 12/453,709

(22) Filed: May 20, 2009

(65) Prior Publication Data

US 2010/0296228 A1 Nov. 25, 2010

(51) Int. Cl.
*G01R 31/12* (2006.01)
*G01R 27/22* (2006.01)
*H01G 4/228* (2006.01)

(52) U.S. Cl. ............................ 324/548; 324/94; 361/540
(58) Field of Classification Search .................... 324/93, 324/92, 76.11, 548, 537, 94; 361/540, 523, 361/503, 502, 500
See application file for complete search history.

(56) References Cited

U.S. PATENT DOCUMENTS

| | | | | |
|---|---|---|---|---|
| 3,731,371 A * | 5/1973 | Piper et al. | .................... | 29/25.03 |
| 4,538,025 A * | 8/1985 | Coe et al. | ........................ | 174/561 |
| 5,600,531 A * | 2/1997 | Jun | ................................ | 361/302 |
| 6,711,000 B2 * | 3/2004 | Takeishi et al. | ................ | 361/523 |
| 6,808,845 B1 * | 10/2004 | Nonaka et al. | ................ | 429/213 |
| 2008/0094812 A1 * | 4/2008 | Kuriyama | ..................... | 361/761 |

* cited by examiner

*Primary Examiner* — Hoai-An D Nguyen
(74) *Attorney, Agent, or Firm* — Bacon & Thomas, PLLC

(57) ABSTRACT

The electrolytic capacitor has an insulating casing, at least one capacitor element and multiple external terminals. The casing has multiple through holes and mounting protrusions. The at least one capacitor element is mounted in the casing and has multiple inner conductive pins connecting to a coil. Each external terminal is attached to a bottom panel of the insulating casing, connects to a corresponding inner conductive pin and has a main body, a connecting portion and two fixing portions. The connecting portion is formed on and extends from a side of the main body and has a conducting hole attached to a corresponding conductive pin. The fixing portions respectively extend from two ends of the main body and engage with the mounting protrusions. Each external terminal provides a soldering surface being flat and having large soldering area, therefore the electrolytic capacitor can be firmly soldered on a circuit board.

8 Claims, 9 Drawing Sheets

ELECTROLYTIC CAPACITOR

BACKGROUND OF THE INVENTION

1. Field of the Invention

The present invention relates to an electrolytic capacitor, especially to an electrolytic capacitor having external terminals with easily secured and soldered conductive pins not requiring excessive working so reducing defects.

2. Description of the Related Art

A conventional electrolytic capacitor may be packaged with a metal casing or an insulating casing and may have conductive pins being connected to the casing and bent into an L-shape or flattened. But bending or flattening may cause stress fractures in the conductive pins and lower the reliability of the electrolytic capacitor. Besides, the manufacturing process of the electrolytic capacitor has a high temperature heating step that may easily cause carbonization of solder coatings of the conductive pins and lower the solderability of the conductive pins.

Furthermore, the conductive pin of the conventional electrolytic capacitor provides a small soldering area due to having a thin and narrow shape. The L-shaped conductive pin is easy to be deformed by external forces and makes the electrolytic capacitor unable to be mounted on a corresponding position of a circuit board. Moreover, connection between the L-shaped conductive pin and the casing is not shock endurable also raising probability of defects.

To overcome the shortcomings, the present invention provides an electrolytic capacitor to mitigate or obviate the aforementioned problems.

SUMMARY OF THE INVENTION

The main objective of the invention is to provide an electrolytic capacitor having external terminals with easily secured and soldered conductive pins not requiring excessive working so reducing defects.

The electrolytic capacitor in accordance with the present invention comprises an insulating casing, at least one capacitor element and multiple external terminals.

The insulating casing has a base and a cover. The base has a top opening, a bottom panel, a chamber, multiple mounting protrusions and multiple through holes. The cover is mounted on the top opening of the base.

The at least one capacitor element is mounted securely in the insulating casing and has a coil and multiple inner conductive pins. The coil is disposed in the chamber of the base. The inner conductive pins are mounted on a bottom end of the coil and respectively extend through the through holes of the base.

The external terminals are attached to the bottom panel of the base and respectively connect to the inner conductive pins of the at least one capacitor element. Each external terminal has a main body, a connecting portion and two fixing portions. The connecting portion is formed on and extends from a side of the main body and has a conducting hole attached to a corresponding conductive pin. The fixing portions respectively extend from two ends of the main body and engage with the mounting protrusions of the base.

Compared with conventional electrolytic capacitor, the present invention is capable of being soldered well and enhanced stability of soldering when using surface mounting technique (SMT). Because the external terminal and capacitor element are made separately, solder coating of the external terminal is not carbonized by a high temperature heating step of the manufacturing process of the capacitor element. Therefore taking the external terminals as the soldering part of the electrolytic capacitor can be soldered well.

With the foregoing structure of external terminals, the electrolytic capacitor provides soldering surfaces that are flat and have large soldering areas, therefore the electrolytic capacitor can be firmly soldered on a circuit board by using surface mount technique (SMT). Since the structure provides multiple fixing points between the external terminals and the insulating casing, the external terminals endure shocks and are not easily deformed by external forces.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIG. 1, 2, 6 to 11, an electrolytic capacitor in accordance with the present invention comprises an insulating casing (10), at least one capacitor element (20) and multiple external terminals (30).

Figure 1:
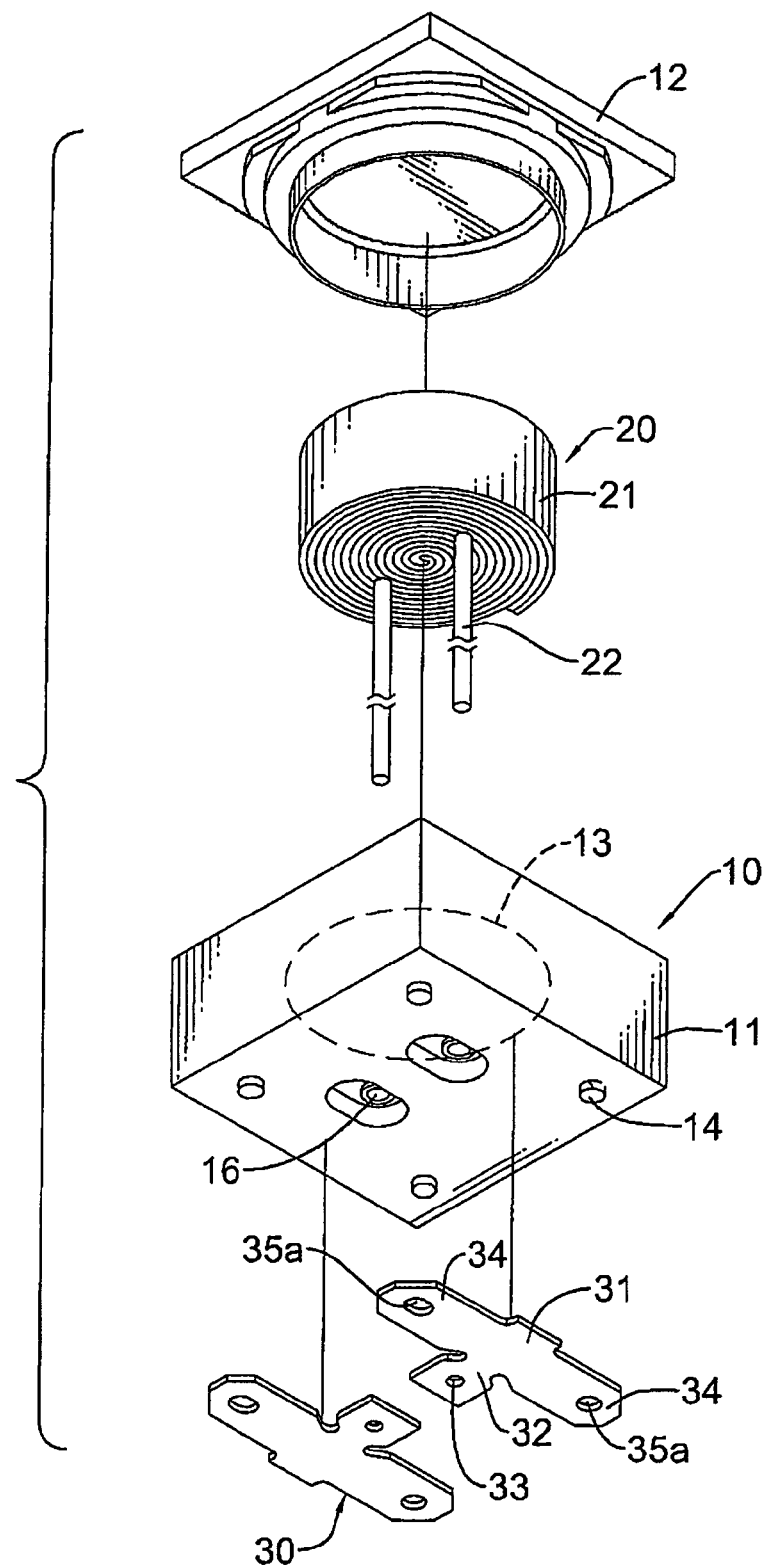
FIG. 1 is an exploded perspective view of a first embodiment of an electrolytic capacitor in accordance with the present invention.
Figure 2:
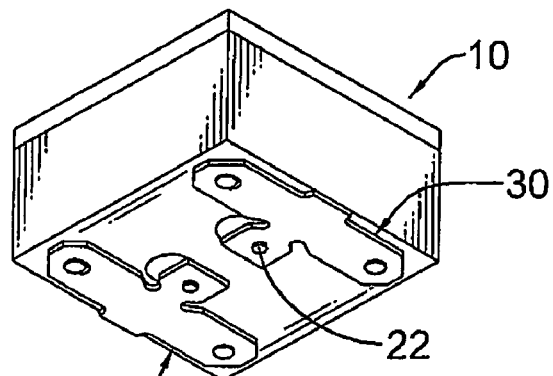
FIG. 2 is a perspective view of the electrolytic capacitor in FIG. 1.
Figure 3:
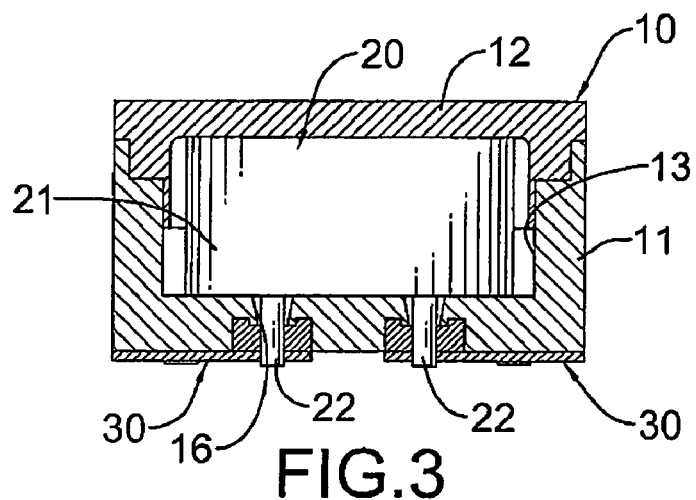
FIG. 3 is a cross sectional side view of the electrolytic capacitor in FIG. 2 embodied as a solid electrolytic capacitor.
Figure 4:
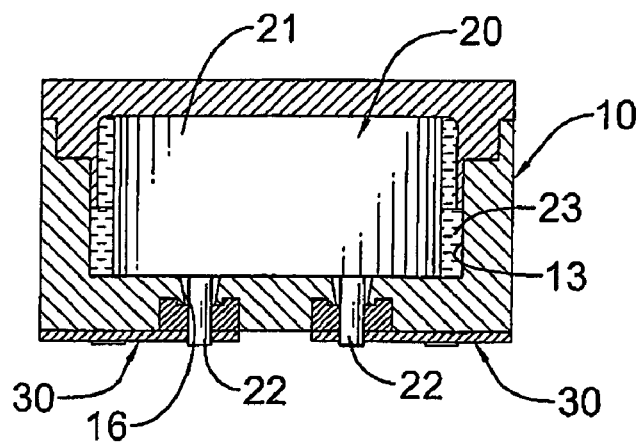
FIG. 4 is a cross sectional side view of the electrolytic capacitor in FIG. 2 embodied as a liquid electrolytic capacitor.

With further reference to FIGS. 3 and 4, the insulating casing (10) has a base (11) and a cover (12). The base (11) has two opposite sidewalls, a top opening, a bottom panel, a chamber (13), multiple through holes (16), multiple optional mounting recesses (15) and multiple mounting protrusions (14). The bottom panel is adjacent to the sidewalls. The through holes (16) are formed through the bottom panel and communicate with the chamber (13). The mounting recesses (15) are formed on the opposite sidewalls of the base (11) and extend to the bottom panel of the base (11). The mounting protrusions (14) are formed on the base (11) and may be formed on the bottom panel of the base (11) or respectively formed in the mounting recesses (15).

When formed in the mounting recesses (15), the mounting protrusions (14) may protrude form the mounting recesses

(15) and have two sides and may be oblique to the mounting recesses (15) and thereby form an inclined surface.

The cover (12) enclosing the top opening of the base (11) and may be made of plastic or aluminum and be mounted on the base (11), or the cover (12) may be a sealing gel solidifying after being applied over the top of the base (11).

Figure 10:
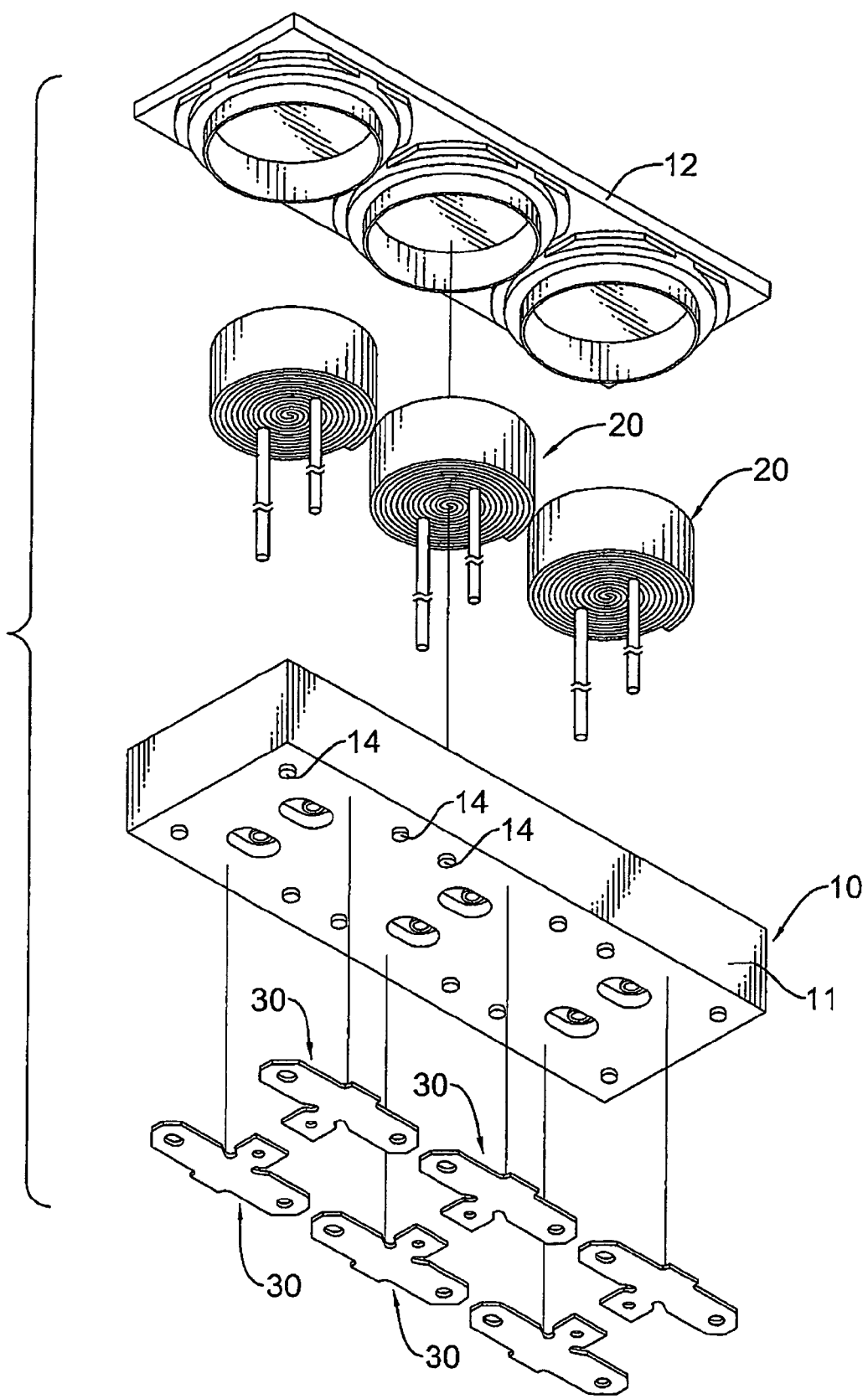
FIG. 10 is a partially exploded, perspective view of a fourth embodiment of the electrolytic capacitor in accordance with the present invention.
Figure 11:
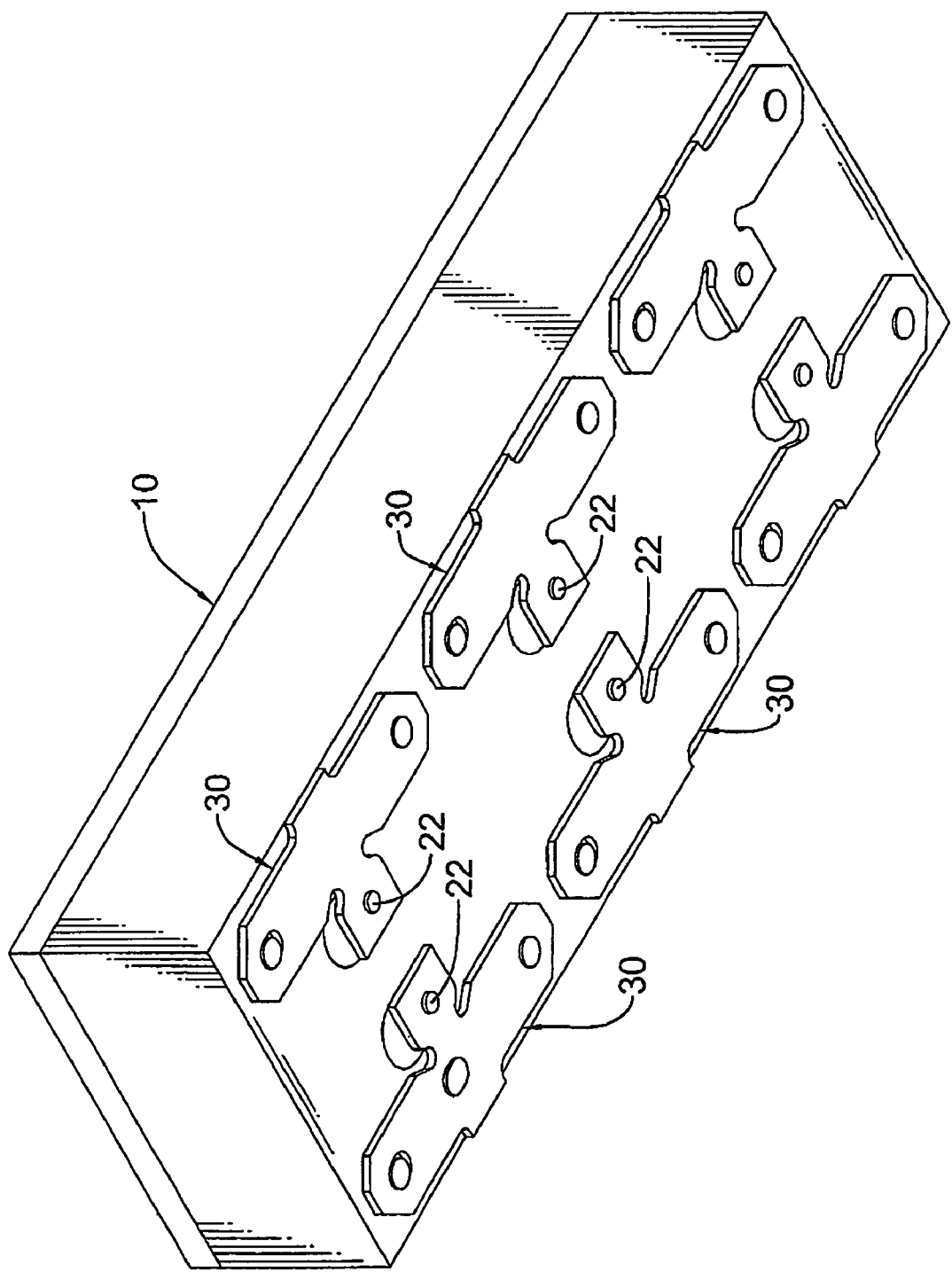
FIG. 11 is a perspective view of the electrolytic capacitor in FIG. 10.

The at least one capacitor element (20) is mounted securely in the insulating casing (10) and has a coil (21) and multiple inner conductive pins (22). Depending on design requirements, the electrolytic capacitor may have one capacitor element (20) as shown in FIGS. 1 to 9 or multiple capacitor elements (20) as shown in FIGS. 10 and 11. The coil (21) is disposed in the chamber (13) of the base (11) and has a bottom end. The coil (21) may be formed by winding an anode foil, a cathode foil and an isolating layer between the anode and cathode foils. When the electrolytic capacitor of the present invention is a solid state electrolytic capacitor, the at least one capacitor element (20) may have a conductive polymer electrolyte applied on and around the anode and cathode foils. When the electrolytic capacitor of the present invention is a liquid state electrolytic capacitor, the chamber (13) of the base (11) may be filled with an electrolytic solution. The inner conductive pins (22) are mounted on the bottom end of the coil (21) and respectively extend through the through holes (16) of the base (11) and may be respectively connected to the anode and cathode foils.

The external terminals (30) are mounted to the bottom panel of the base (11) and respectively connect to the inner conductive pins (22) of the at least one capacitor element (20). Each external terminal (30) has a main body (31), a connecting portion (32) and two fixing portions (34).

The main body (31) has a side and two ends.

The connecting portion (32) is formed on and extends from the side of the main body (31) and has a conducting hole (33) attached to a corresponding inner conductive pin (22).

The fixing portions (34) respectively extend from the ends of the main body (31) and engage the mounting protrusions (14) of the base (11). Each fixing portion (34) may have a fixing hole (35a) attached to a corresponding mounting protrusion (14) when the mounting protrusions (14) are formed on the bottom of the base (11).

When the mounting protrusions (14) are formed in the mounting recesses (15), each fixing portion (34) may extend perpendicularly from the ends of the main body (31). The fixing portions may have an engaging hole (35b, 35c) mounted around and engaging a corresponding mounting protrusion (14). When the mounting protrusions have the inclined surface, the fixing portions (34) are respectively slid along the inclined surfaces of the mounting protrusions (14) and hooked over the mounting protrusions (14) by the engaging holes (35b).

Further, the engaging holes (35c) may be formed through ends of the fixing portions (34) to form clamping arms, each clamping arm may further have a boss protruding therefrom and clamping a corresponding mounting protrusion (14) when mounted on the mounting protrusions (14) of the base (11).

Figure 5:
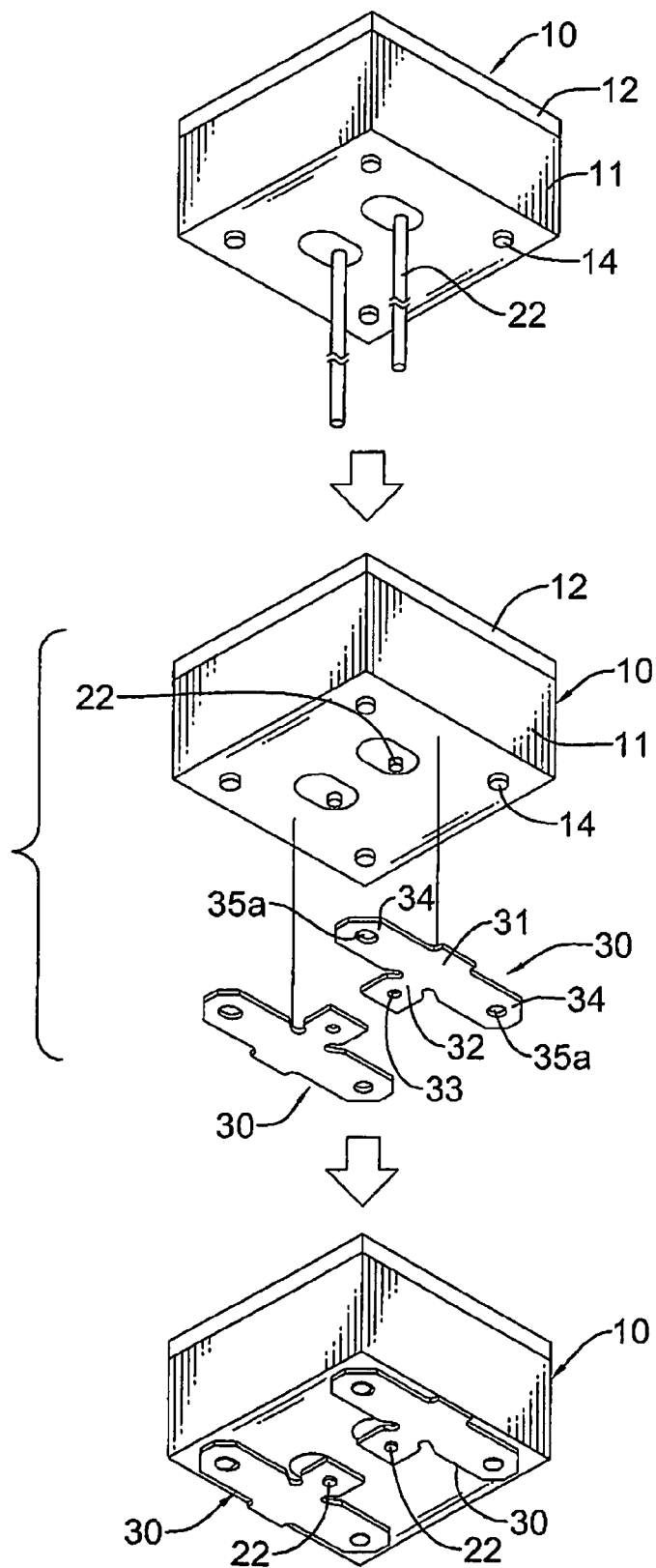
FIG. 5 is a perspective view of a production process of the electrolytic capacitor in FIG. 2.
Figure 6:
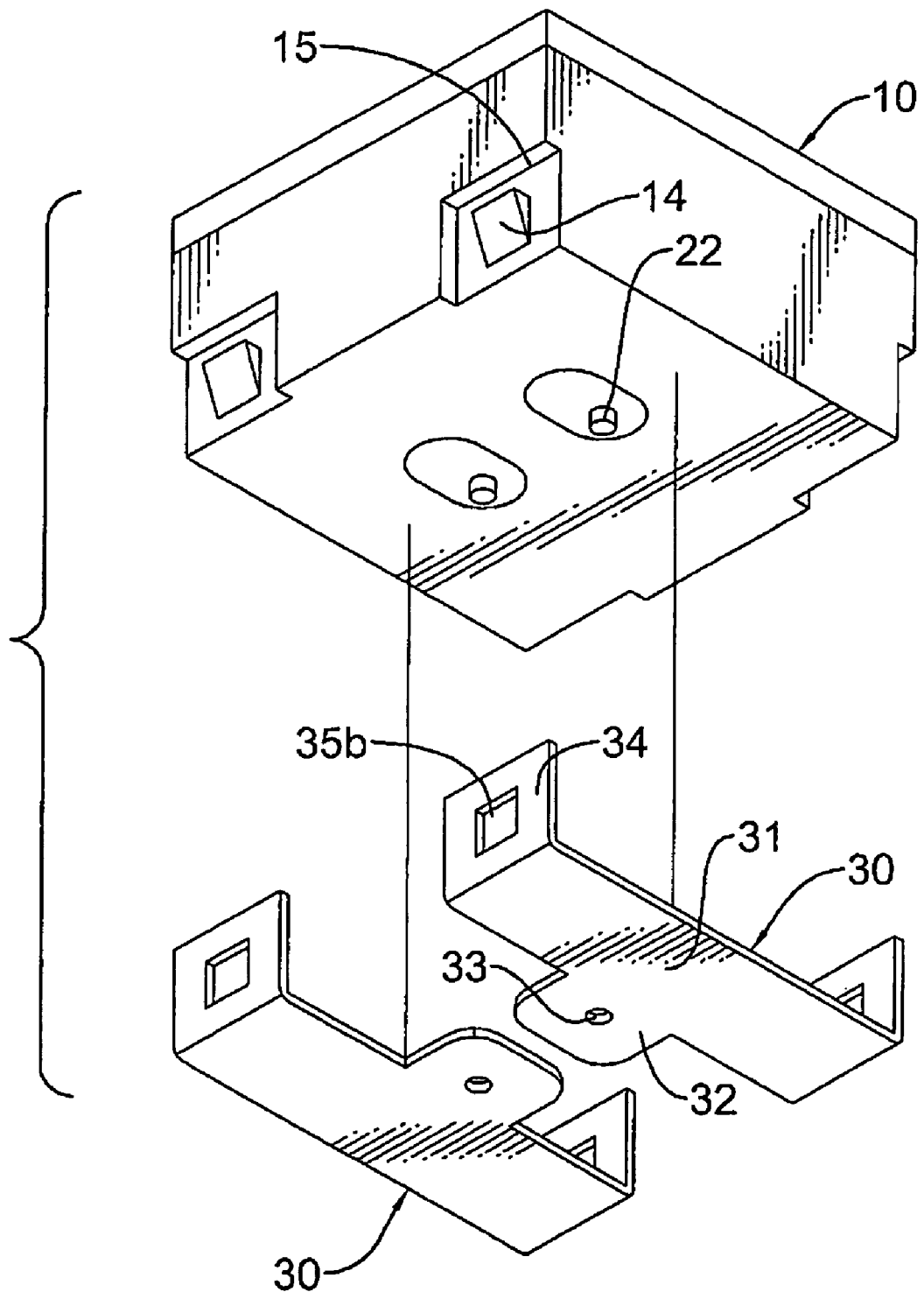
FIG. 6 is a partially exploded, perspective view of a second embodiment of the electrolytic capacitor in accordance with the present invention.
Figure 7:
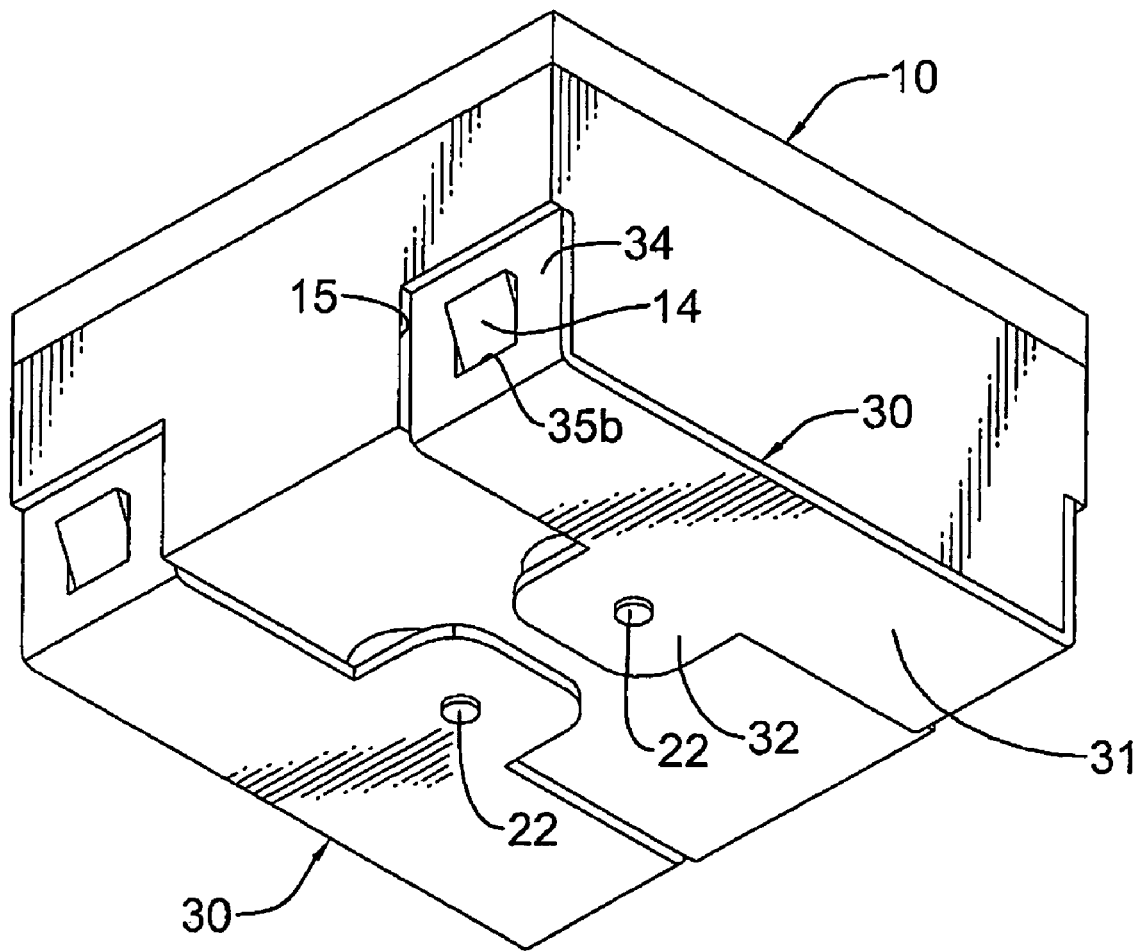
FIG. 7 is a perspective view of the electrolytic capacitor in FIG. 6.
Figure 8:
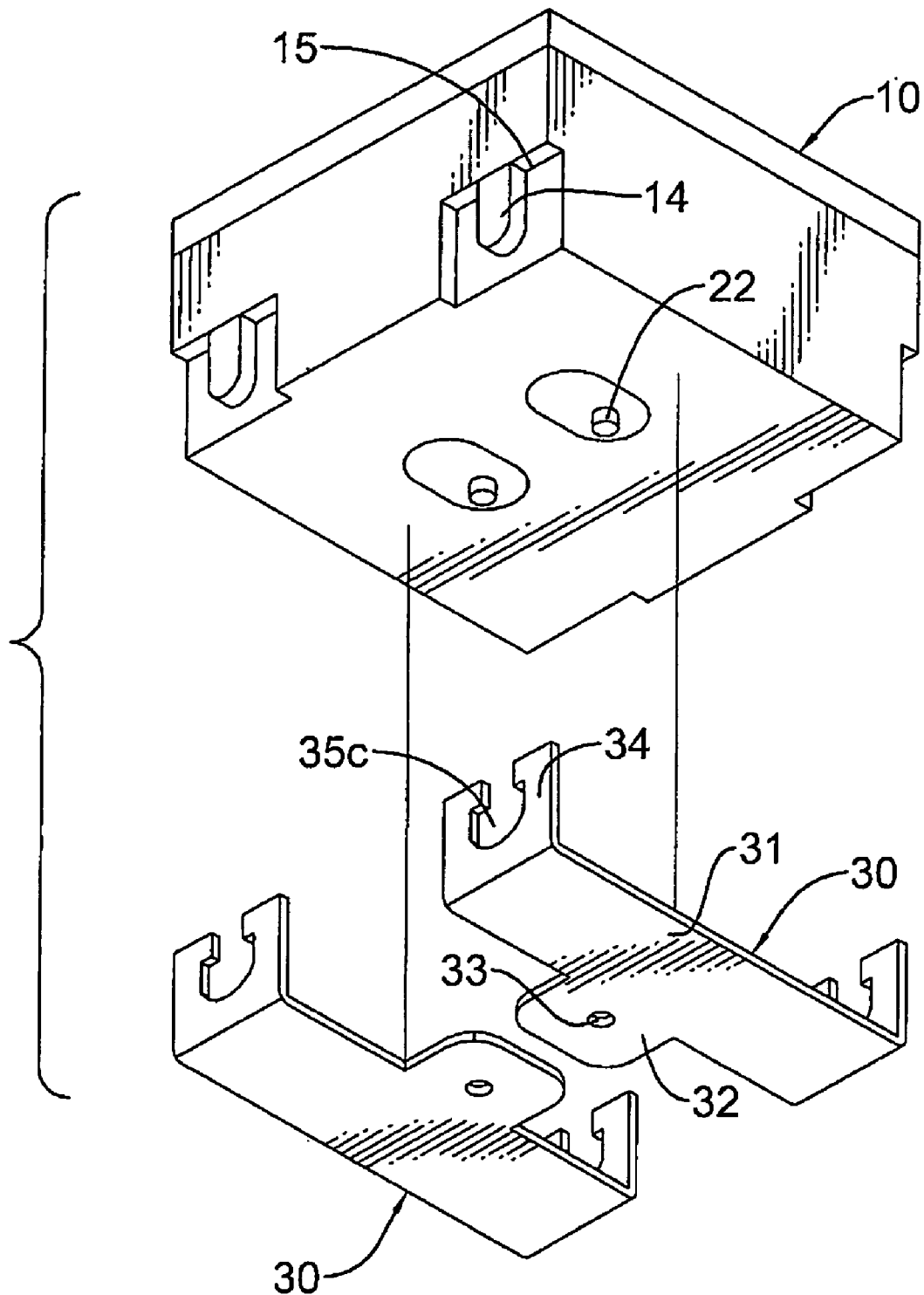
FIG. 8 is a partially exploded, perspective view of a third embodiment of the electrolytic capacitor in accordance with the present invention.
Figure 9:
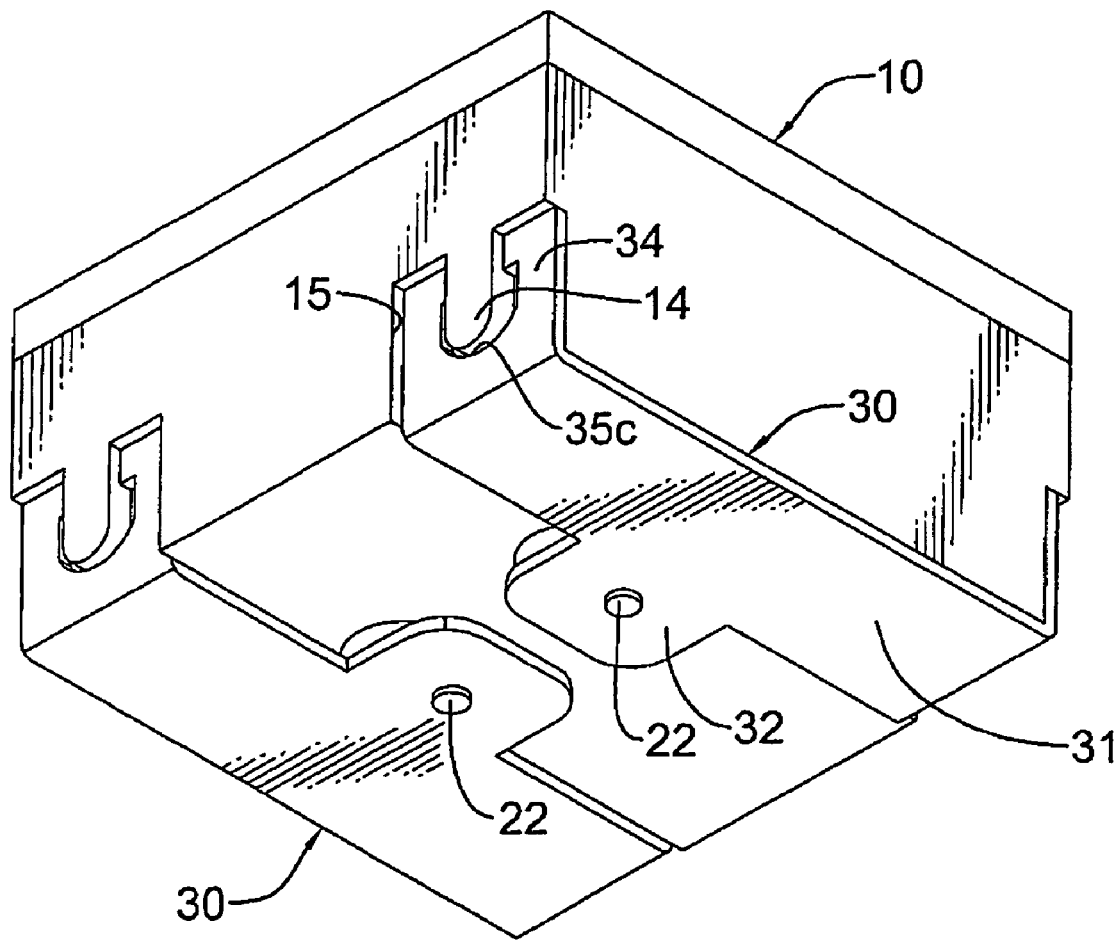
FIG. 9 is a perspective view of the electrolytic capacitor in FIG. 8.

With further reference to FIG. 5, during manufacture, the inner conductive pins (22) have a surplus length which is cut to a suitable length after extending through the through holes (16) of the base (11). The external terminals (30) then correspondingly connect to the inner conductive pins (22) with the conducting holes (33).

Each external terminal (30) provides a soldering surface that is flat and has a large soldering area and so can be soldered well; therefore the electrolytic capacitor can be firmly soldered on a circuit board using surface mount technique (SMT). Since the structure provides multiple fixing points between the external terminals (30) and the insulating casing (10), the external terminal (30) is shock endurable and is not easily deformed by external forces.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A electrolytic capacitor comprising:
   an insulating casing having
      a base having
         two opposite sidewalls;
         a top opening;
         a bottom panel being adjacent to the sidewalls;
         a chamber;
         multiple through holes being formed through the bottom panel and communicating with the chamber; and
         multiple mounting protrusions formed on the base; and
      a cover enclosing the top opening of the base;
   at least one capacitor element being mounted securely in the insulating casing and having
      a coil being disposed in the chamber of the base and having a bottom end; and
      multiple inner conductive pins being mounted on the bottom end of the coil and respectively extending through the through holes of the base; and
   multiple external terminals being mounted on the bottom panel of the base, respectively connecting to the inner conductive pins of the at least one capacitor element and each external terminal having
      a main body having a side and two ends;
      a connecting portion being formed on and extending from the side of the main body and having a conducting hole attached to a corresponding conductive pin; and
      two fixing portions respectively extending from the ends of the main body and engaging the mounting protrusions of the base.

2. The electrolytic capacitor as claimed in claim 1, wherein the mounting protrusions are formed on the bottom panel of the base; and
   each fixing portion of the external terminals has a fixing hole attached to a corresponding mounting protrusion.

3. The electrolytic capacitor as claimed in claim 1, wherein the base of the insulating casing further has multiple mounting recesses formed on each sidewall of the base and extending to the bottom panel of the base;
   the mounting protrusions of the base are respectively formed in the mounting recesses; and
   each fixing portion of the external terminals extends perpendicularly from the ends of the main body and has an engaging hole mounted around and engaged a corresponding mounting protrusion.

4. The electrolytic capacitor as claimed in claim 3, wherein the engaging holes are formed through ends of the fixing portions and clamp a corresponding mounting protrusion.

5. The electrolytic capacitor as claimed in claim 1, wherein the cover of the insulating casing is made of plastic.

6. The electrolytic capacitor as claimed in claim 1, wherein the cover of the insulating casing is made of aluminum.

7. The electrolytic capacitor as claimed in claim 1, wherein the cover of the insulating casing is a sealing gel solidifying after being applied over the top opening of the base.

8. The electrolytic capacitor as claimed in claim 3, wherein each mounting protrusion is oblique to the mounting recesses and thereby form an inclined surface.

\* \* \* \* \*